United States Patent [19]

Maekawa et al.

[11] Patent Number: 4,615,301
[45] Date of Patent: Oct. 7, 1986

[54] FISH BREEDING APPARATUS

[75] Inventors: Takashi Maekawa, Tokyo; Hiroshi Sasaki, Yokohama; Shinji Morimura, Kanagawa, all of Japan

[73] Assignee: Bridgestone Tire Co., Ltd., Tokyo, Japan

[21] Appl. No.: 290,536

[22] Filed: Aug. 6, 1981

[30] Foreign Application Priority Data

Aug. 8, 1980 [JP] Japan ............................ 55-111642[U]

[51] Int. Cl.$^4$ ............................................. A01K 63/00
[52] U.S. Cl. ........................................................ 119/3
[58] Field of Search ................. 119/2, 3, 4; 43/7, 100, 43/103, 104, 105

[56] References Cited

U.S. PATENT DOCUMENTS

| 4,003,338 | 1/1977 | Neff et al. | 119/3 |
| 4,084,543 | 4/1978 | Pequegnat | 119/3 |
| 4,141,318 | 2/1979 | MacVane | 119/3 |
| 4,252,081 | 2/1981 | Smith | 119/3 |

FOREIGN PATENT DOCUMENTS

| 587915 | 1/1978 | U.S.S.R. | 119/3 |
| 644425 | 1/1979 | U.S.S.R. | 119/3 |

Primary Examiner—Jay N. Eskovitz
Attorney, Agent, or Firm—Sughrue, Mion, Zinn, Macpeak & Seas

[57] ABSTRACT

A fish breeding apparatus is disclosed, which comprises a frame body for the fish breeding framed by connecting rod elastic reinforcements to each other into a polygon at a side number of 4 to 30 through bent couplings, and a mooring cable connected at its one end to each of the bent couplings.

3 Claims, 2 Drawing Figures

FISH BREEDING APPARATUS

This invention relates to a fish breeding apparatus.

In fish breeding apparatus for breeding or catching and preserving fish and shellfish inside a net submerged beneath the sea, the net is hung and supported by a rigid frame body floating on the surface of the sea. In order to improve efficiency of breeding or catching and hauling, it is necessary to provide a fish breeding apparatus having a large breeding capacity, particularly a large projection plane. When iron material or the like is used as the rigid frame body together with a float member, however, the frame body must have an abnormally large cross-sectional coefficient in order to withstand external force such as waves or the like.

Figure 1:
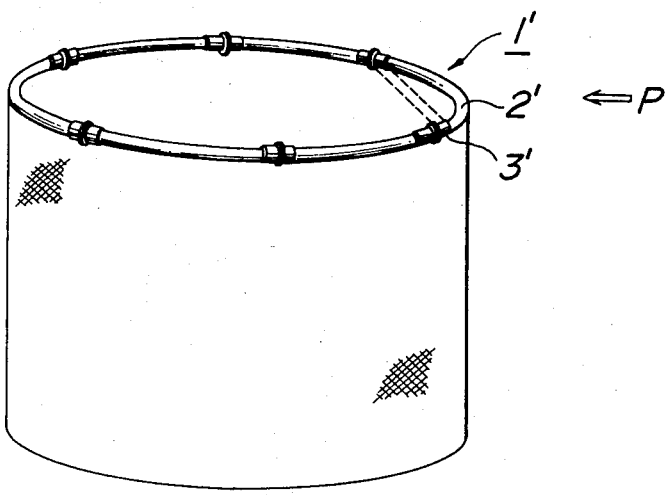

As shown in FIG. 1, a frame body 1' for fish breeding is constructed by connecting a plurality of reinforcing hoses 2' each embedded a tension-resistant reinforcement therein to each other through plural straight couplings 3', so that its projection plane is virtually shaped into a circle by the curving of the reinforcing hoses 2'. A large fish breeding apparatus having a diameter over 30 m to 100 m, can be manufactured, having a large capacity of 6 to 70 times a conventional one made of a rigid frame body of about 10 m at four sides.

However, when the fish breeding frame body 1' using such reinforcing hoses 2' is taken in tow or is particularly used in the ocean of a strong tidal current, a strong external force P from the specified direction is subjected to the frame body 1'. As a result, the reinforcing hose 2' forced into an initial bent posture by the straight coupling 3' tends to restore an original linear state as shown by a broken line in FIG. 1. Therefore, a crease having a small curvature is produced around the circumference of the straight coupling 3', and consequently the kinking of the reinforcing hose 2' constituting the frame body 1' is generated to cause damage.

It is, therefore, an object of the invention to overcome the above mentioned drawbacks and to provide a fish breeding apparatus which fully withstands towing or use in the ocean with a tidal current.

According to the invention, a fish breeding apparatus comprises a frame body for the fish breeding, which being framed by connecting rod elastic reinforcements to each other into a polygon at a side number of 4 to 30 through bent couplings, and a mooring cable connected at its one end to each of said bent couplings.

Figure 2:
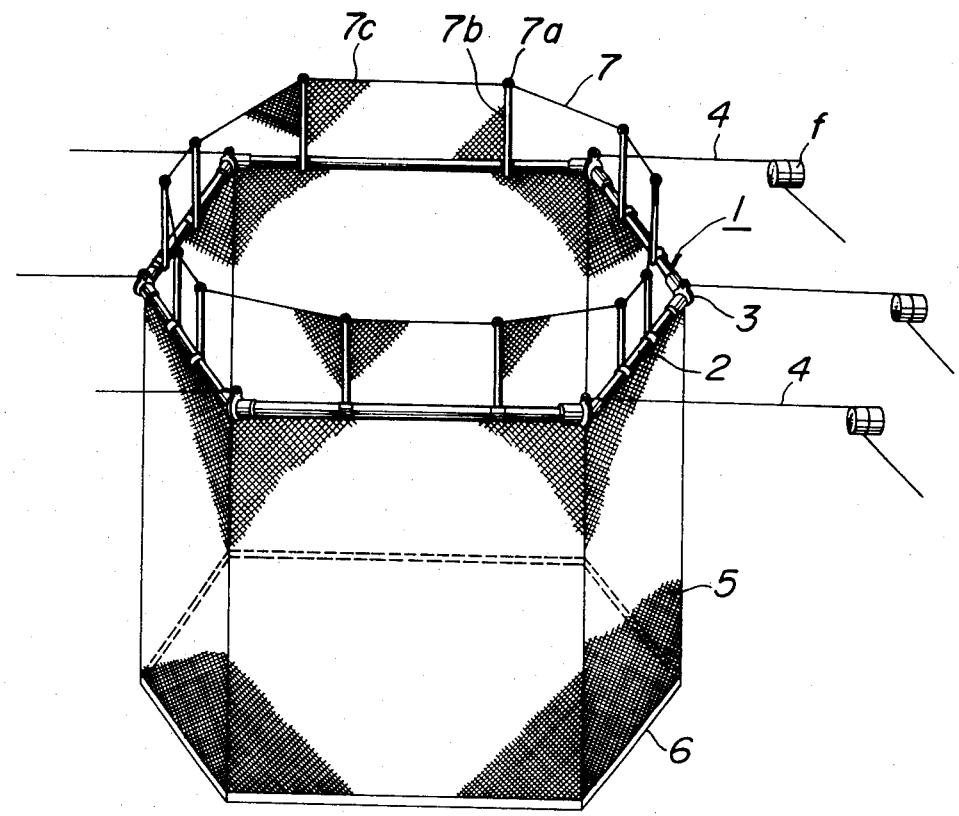

The invention will now be described with reference to the accompanying drawings, wherein:

FIG. 1 is a perspective view of the conventional large fish breeding apparatus; and FIG. 2 is a perspective view of an embodiment of the fish breeding apparatus according to the invention.

The invention will be explained with reference to examples shown in the drawings in detail.

FIG. 2 is a perspective view showing an embodiment of the fish breeding apparatus according to the invention under water, wherein reference numeral 1 is a frame body for the fish breeding composed of plural rod elastic reinforcements 2, such as hollow reinforcing hoses, and the like. In this case, if necessary, fluids such as air and sea water are alternately supplied and discharged in the inside of the reinforcing hose 2, whereby the weight in the water of the hose and further the modulus of elasticity thereof can be varied.

Reference numeral 3 is a bent coupling for connecting the reinforcing hoses 2 to each other at a right angle or obtuse angle, which forms a vertical angle in a polygonal main body of the fish breeding apparatus.

In order to keep each of the reinforcing hoses 2 independent, a blind plate may be inserted between the opposed flanges of the adjacent bent flanged couplings. In this case, even if one of the reinforcing hoses is broken, the remaining reinforcing hoses can support the fish breeding apparatus on the sea surface.

Reference numeral 4 is a mooring cable connected at its one end to each of the bent couplings 3 and fixed at the other end to a submarine anchor (not shown) or a towing watercraft. If necessary, a float f may be disposed in the middle of the mooring cable 4, whereby not only a vertical component of tension applied to the mooring cable 4 is absorbed, but also a buffer action can be developed so as not to directly transmit pulsation of tension and slackening of the mooring cable caused by waves to the fish breeding apparatus.

In addition, reference numeral 5 is a net body fixed at its top end to the frame body 1 and hung down therefrom, and reference numeral 6 is a weight fixed to the bottom end of the net body 5 in parallel with each side of the frame body 1. Moreover, the net 5 is extended to each entire surface of the top and bottom portions to define a fish breeding netted tank.

Reference numeral 7 is a balustrade comprising plural rod bodies 7b each standing upright from the inside of the frame body 1 and provided at its top end with a ring 7a, and a rope 7c extending through the rings 7a around the frame body 1. The presence of the balustrade 7 serves to ensure the worker's safety during working on the frame body. If the net 5 is hung down from the rope 7c, the ceiling net can be omitted. If necessary, a shock absorbing device may be attached to the outer surface of the frame body at the bottom of the rod body to protect the frame body from damage due to collision with a fishing boat or the like.

The bent coupling 3 forms the peak of a polygon of 4 to 30 sides containing the rod elastic reinforcement 2 as a side.

The above embodiment illustrates the case that the number of the above sides is 6, i.e., a hexagon. If the side number is less than 4, however, the fish breeding apparatus is small in capacity, while if the side number is more than 30, there are too many mooring points corresponding to nodular points of the frame body 1, and as a result, the working efficiency lowers and becomes impractical. Moreover, the length of one side of the frame body can be extended by connecting a plurality of the elastic reinforcements 2 to each other through straight couplings.

According to the fish breeding apparatus of this invention as explained above, the elastic reinforcements are connected to each other through the bent couplings and the bent coupling as each peak of the resulting polygonal frame body is moored by the mooring cable under tension, so that each piece of the frame body has a large deformation resistance against external force of a tidal current and so on likewise a both end-fixed beam, and the capacity of the fish breeding apparatus can be maintained even under the external force.

What is claimed is:

1. A fish breeding apparatus comprising; a frame body for fish breeding, said frame body framed by connecting hollow reinforcing hoses as an elastic reinforcement into a polygon having 4 to 30 sides through bent couplings, and a mooring cable connected at one end to each of said bent couplings under tension.

2. A fish breeding apparatus according to claim 1, wherein a blind plate is inserted between opposed flanges of said adjacent bent couplings.

3. A fish breeding apparatus according to claim 1, wherein said frame body is provided with a balustrade comprising plural rod bodies each standing upright from the inside of said frame body and provided at its top end with a ring, and a rope extending through said rings around said frame body.

* * * * *